(12) United States Patent
Grady (10) Patent No.: US 6,181,027 B1
(45) Date of Patent: Jan. 30, 2001

(54) DC POWER DISTRIBUTION

(75) Inventor: Philip Edward Grady, Kannapolis, NC (US)

(73) Assignee: International Business Machine Corp., Armonk, NY (US)

( * ) Notice: Under 35 U.S.C. 154(b), the term of this patent shall be extended for 0 days.

(21) Appl. No.: 09/259,097

(22) Filed: Feb. 26, 1999

(51) Int. Cl.[7] .................................................. G05F 1/10
(52) U.S. Cl. ............................ 307/31; 323/263; 323/909
(58) Field of Search .................................... 323/282, 267, 323/909, 273; 307/31, 10.1, 10.8; 361/63, 65, 87, 93.7

(56) References Cited

U.S. PATENT DOCUMENTS

| | | | |
|---|---|---|---|
| 3,098,192 | * 7/1963 | Levy, Jr. et al. | 323/22 |
| 3,532,936 | * 10/1970 | Kuster | 317/31 |
| 4,551,668 | * 11/1985 | Kammiller | 323/909 |
| 4,585,987 | * 4/1986 | Prue, Jr. et al. | 323/909 |
| 4,635,057 | * 1/1987 | Schaefer | 323/909 |
| 4,788,449 | 11/1988 | Katz | 307/43 |
| 5,254,877 | 10/1993 | Tice et al. | 307/66 |
| 5,319,536 | 6/1994 | Malik | 363/65 |
| 5,448,155 | * 9/1995 | Jutras | 323/285 |
| 5,500,791 | 3/1996 | Kheraluwala et al. | 363/17 |
| 5,672,997 | * 9/1997 | Shield | 327/538 |
| 5,777,276 | 7/1998 | Zhu | 174/263 |
| 5,977,757 | * 11/1999 | Felps | 323/282 |

\* cited by examiner

Primary Examiner—Josie Ballato
Assistant Examiner—Rios Roberto
(74) Attorney, Agent, or Firm—Karl O. Hesse (57) ABSTRACT

Apparatus and method is disclosed for overcoming the voltage attenuation and ground shifts normally associated with providing DC power to distributed loads from a DC power supply without the need for excessively large conductors, the need to distribute the DC power supply or the need to provide converters at or near each load. Reasonably accurate voltage regulation at each load is provided according to the invention while using low but not insignificant resistance power conductors by providing similarly low resistance voltage sense conductors. The loads are connected between the sense conductors in a distributed fashion. Current approximating that drawn by each load is injected from the power conductors to the sense conductors at or near each load. Dynamic current requirements are supplied by capacitors connected across each load, usually mounted on the load circuit boards. Stability during power up is provided by capacitors connected between each power conductor and it's respective sense conductor at the power supply.

18 Claims, 4 Drawing Sheets

DC POWER DISTRIBUTION

BACKGROUND OF THE INVENTION

1. Field of the Invention

The present invention relates to machines that require high DC currents to be distributed over significant distances to multiple high current loads. More particularly, the present invention relates to an economical DC current distribution method and apparatus for use with electronic devices having fairly constant and well defined DC current requirements and that do not exhibit large dynamic variation or that are substantially buffered by capacitors at each load.

2. Description of Related Art

The use of an AC to DC converter or DC to DC converter at each load is a known way to provide for distributing DC power to each load without the negative effects of resistive voltage drop and ground shift as is experienced in a simple metal conductor distribution system. Each converter acts as a power supply for its' load. This approach is expensive in that numerous complex power control circuits are required in the system. It becomes even more expensive when redundancy is required to be built into the distribution system since a redundant supply or converter is needed for each load. Also when the power distribution system becomes large, distributed converters must be placed at intervals of several meters along a cable of ten meters or more. Such placement often presents a problem of instability and noise in the paralleling circuits and sensing circuits.

U.S. Pat. No. 5,319,536 issued to Malik, is an example of paralleling in which three converters, 11, 13 and 15 are connected in parallel to load 23.

U.S. Pat. No. 5,500,791 issued to Kheraluwala et al. teaches solving these problems by providing a dual active bridge converter generating 100,000 Hertz AC power square wave output which can be converted to DC by a converter at each load. The converters of Kheraluwala need not have such massive magnetic paths as would be required by a 60 Hertz system but there is still the need for a transformer, rectifier and possibly a voltage regulator at each load.

U.S. Pat. No. 5,254,877 issued to Tice et al. is another example of additional active power supply units being added along a distribution line. In Tice et al. a control panel provides power and communicates with smoke detectors and intrusion detectors. The line conductors 14a and 14b of Tice et al. serve as both signaling lines and power distribution lines and as is usual, the detectors farthest from the control panel would receive attenuated power levels. Tice et al. overcome this attenuation by providing distributed power supplies with synchronizing circuits, the added power supplies sense and respond to power pulses from the main control panel to inject supplemental amounts of power into the line during the power distribution time intervals. These added power supplies are relatively costly and they themselves require an external source of power such as from a AC power receptacle.

U.S. Pat. No. 5,777,276 issued to Zhu describes distribution of power on a computer motherboard using an auxiliary conductor system to reduce voltage loss due to high currents through resistive areas in the contact regions between connector posts and conductive layers buried in the motherboard. In the motherboard of Zhu, the conductors themselves are considered to have negligible resistive losses which of course is not the case in machines having larger distribution distances. The teachings of Zhu do not account for voltage loss in the original conductor or the auxiliary conductor and therefore his teachings do not concern voltage variations as a function of distance.

U.S. Pat. No. 4,788,449 issued to Katz describes a matrix of loads being supplied by a column of power supplies and redundantly by a row of power supplies. Although this teaching may solve a problem of the prior art with a short circuit in one load causing failure of power to all others in the same row, this teaching does not solve the problem of DC power attenuation at the farthest most load such as load 15 for example The present invention overcomes these inadequacies, problems and disadvantages of the prior art by means of the apparatus and method of the invention which is summarized below.

SUMMARY OF THE INVENTION

An advantage of the present invention is that the size of the DC power distribution cables can be a smaller gauge without excessively sacrificing voltage regulation at each distributed load. Another way of stating this advantage is that by dividing a power distribution conductor into a power distribution conductor and a similarly sized sense conductor, significantly better voltage regulation may be obtained at each load to which power is being distributed. The improved regulation at each load is accomplished without requiring an increase in the combined conductivity of the power and sense conductors over that needed in a single power distribution conductor.

Another advantage of the instant invention is that multiple redundant power supplies, each with remote sensing, may be provided at a base module, redundantly supplying power to multiple modules without the problem of instability that often accompanies such redundant systems.

A further advantage of this invention is that a module may be removed from the system or a module may be added to the system without excessively changing the regulation of voltage provided to other modules.

Another advantage of the invention is provided by permitting implementation of current controlling resistors to be in the form of cable wire. Such implementation serves multiple purposes. It simplifies connections while balancing currents to loads and at the same time provides parallel paths in a power cable, which has the effect of lowering overall resistance power losses. It also has the benefit of distributing the heat over a wider area so that extra cooling or heat sinks are not needed.

These and other advantages of the invention, which will become apparent to the reader, are obtained by a novel arrangement of current carrying conductors which tailor and balance current delivered to each load. Tailoring of current to a load is accomplished by a current controlling resistance at each load. Balance of voltages between loads is accomplished by allowing a sense conductor to carry excess currents from one load to another. Current substantially equal to that drawn by each load is injected from current supply conductors to the sense conductors at or near each load. Current controlling resistances are embodied in lengths of wire in certain embodiments.

DESCRIPTION OF THE PREFERRED EMBODIMENT

Figure 1:
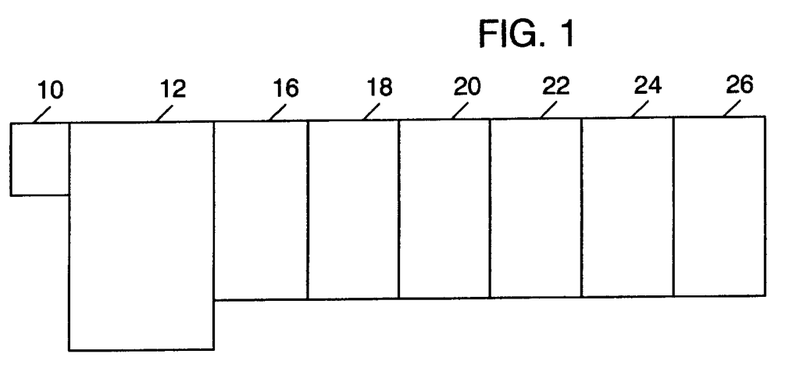
FIG. 1 is a high level diagram of an example machine in which the invention finds utility.

FIG. 1 portrays an overall environment of a document processing machine wherein the invention finds utility. The machine comprises a base module 12 having a document input station 10 and a power supply not shown. Base module 12 may for example also contain the main computer for the machine as well as read stations to capture the intelligence in the various media on the document. Postal letter or other sorting machines, check processing machines, telephony equipment, and rack mounted equipment are example machines that benefit from the instant invention.

Module 16 is an image capture device such as a microfilm unit, scanner or other electronic image capture equipment. Modules 18, 20, 22, 24 and 26 are document stacker modules. The number of stacker modules may be different from one machine to another due to the differing number of sorts required. It is desirable that the stacker modules all be identical so that their order of placement in the machine is not critical to the quality of voltage regulation.

Figure 2:
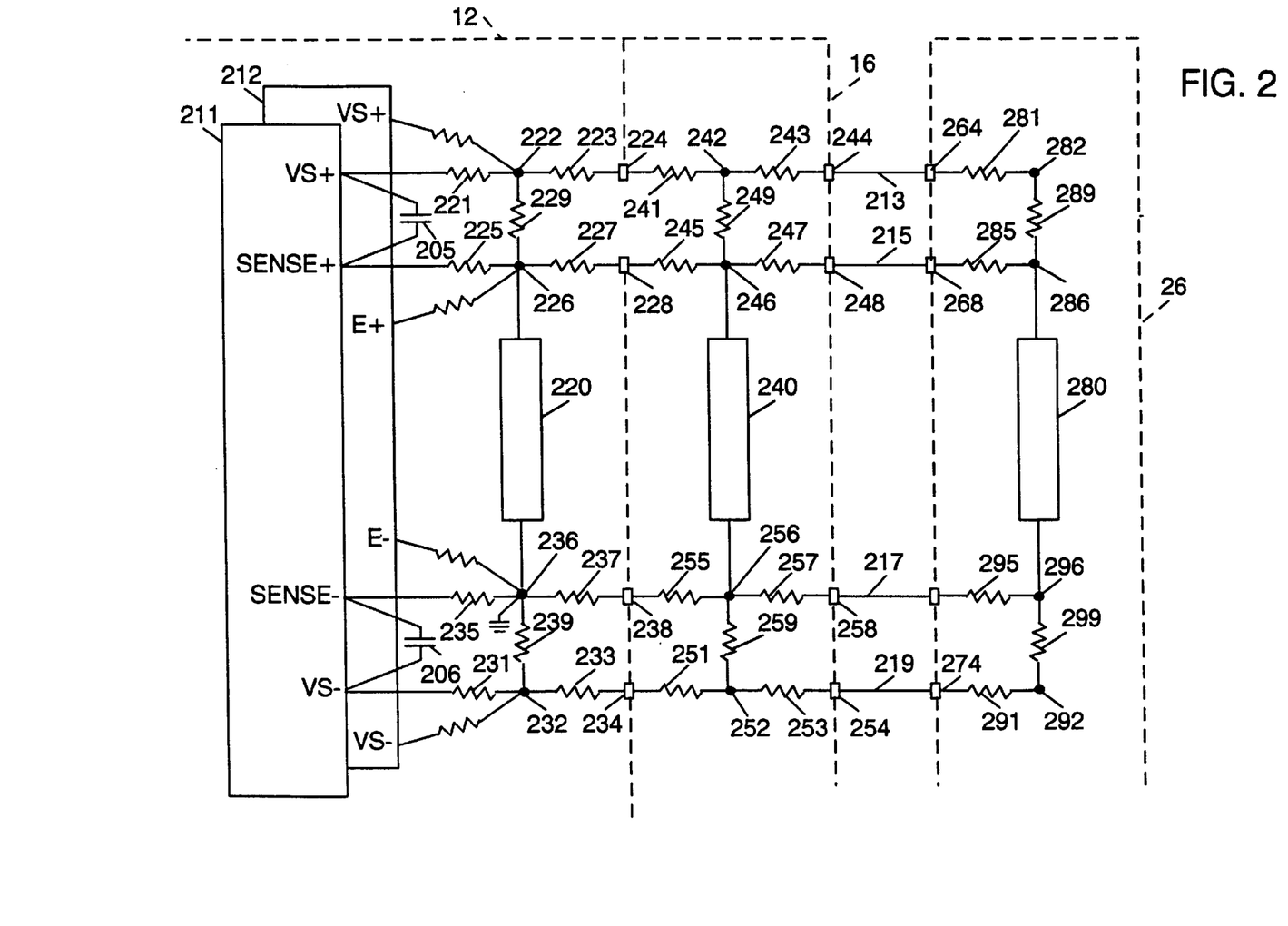
FIG. 2 is a circuit diagram showing the parts of the invention.

FIG. 2 is a circuit diagram of the preferred embodiment of the invention. FIG. 2 shows the base module 12 and two of the stacker modules 16 and 26. The base module 12 has a power supply 211. Power supply 211 has positive regulated voltage and current supplying output VS+ and negative regulated voltage and current supplying output VS−. Power supply 211 is of a remote sensing design where the voltage between VS− and VS+ is adjusted by the supply so that the voltage between a positive voltage sensing input SENSE+ and a negative voltage sensing input SENSE− attains a desired value such as for example, a nominal five volts. Five volts with a plus or minus five percent tolerance is used for driving digital circuit loads 220, 240 and 280 such as computers and other digital logic circuit boards. The sense inputs are usually connected to the VS outputs at the load being supplied with power so that the voltage drop in conductors between the VS outputs and the load is accounted for by a higher voltage setting which is controlled by the sense inputs.

This remote sensing design works well when a single load is driven remotely by the power supply. When several remote loads are being driven, other solutions must be found such as use of a very low resistance conductor to minimize voltage drops between loads or providing a regulated power supply at each load. Both of these solutions are more expensive and have other drawbacks as well. Since zero resistance can not be obtained at room temperatures, there will always be a difference between the voltages supplied to each load when power is supplied by a simple low resistance conductor.

This invention solves the problem of conductor resistance. Higher current densities are conducted over substantial distances by allowing the voltage between VS+ and VS− supplied by power supply 211 to rise adequately to provide a substantially correct voltage to a most difficult to supply load, while employing current controlling resistors to limit current and thereby voltage at other loads. The use of current control to achieve voltage regulation is usually considered to be a less than optimum approach because of it's sensitivity to load current changes. This invention overcomes regulation sensitivity to load changes and to load current changes by connecting a low resistance sense conductor from load to load. The sense conductor tends to distribute excess current at one load to other loads, changing the sense conductor voltage, which is then detected by the power supply and used to modify the voltage between outputs VS.

Power is distributed to each module of the machine according to a preferred embodiment of the invention through segmented current supply conductors 213 and 219 which are connected at one end to the outputs VS+ and VS− respectively of supply 211. A segment of the current supply conductor is contained within each module. As the modules are connected together in a daisy chain fashion, the segments are connected together, end to end, to form each conductor. A redundant supply 212 may be connected in parallel to conductors 213 and 219 to provide power in the event that supply 211 fails. Supplies 211 and 212 will be connected to conductors 213 and 219 through isolating diodes to isolate an operating supply from a failed supply that failed due to a short circuit in it's output.

Conductors 213 and 219 have low but not zero resistance. Conductor resistance is a function of the conductor length. The resistance of conductors 213, 215, 217 and 219 is shown in FIG. 2 as being distributed discretely for convenience in explanation of the invention. Resistor 221 is the resistance of the length of a two gauge wire from each power supply output terminal VS+ to connection node 222. Resistor 223 is the resistance of a length of an eight gauge wire from connection node 222 to a connector 224 between base module 12 and a stacker module 16 for providing current to stacker 16.

Sense conductors 215 and 217 also have low but not zero resistance. In prior designs, negligible current flowed in a sense line since its only function was to supply a voltage reading from a single remote load back to the sense input of the power supply. In this invention, a sense conductor also serves to balance voltages among loads when a load is removed or when a load changes its current consumption. Thus resistor 225 is the resistance of the length of a wire from the power supply sense terminal SENSE+ to connection node 226. Resistor 227, at times carries load balancing current and it is the resistance of parallel lengths of two eight gauge wires from connection node 226 to a connector 228 between base module 12 and stacker module 16 for providing sense voltage and balancing current to and from stacker 16.

Capacitors 205 and 206 are provided to control voltage swings during power on. Capacitors 205 and 206 prevent large output voltage over shoot at the VS terminals by providing a low impedance path from the current supply conductors to the sense conductors during power on transients. Capacitor 205 is connected between VS+ and SENSE+. Capacitor 206 is connected between VS− and SENSE−.

Power supply 211 has an over voltage shut down feature which shuts off the power supply 211 if the voltage between VS+ and VS− exceeds a value such as 6.7 volts. This feature is advantageously used to improve safety in this invention by shutting down the supply of power if a short circuit occurs some distance from the supply. The resistances of this invention may otherwise continue to generate more than normal heat during the short circuit condition and that could be a safety concern.

The current provided to load 220 in the base unit 12 is controlled by discrete current supply resistor 229. Load 220 includes a main computer and other digital logic circuits. Resistor 229 is connected between connection node 222 and connection node 226. The positive nominal five volt power input to the circuit boards of load 220 in the base unit is also connected to node 226. Unlike later described resistors, resistor 229 will usually be implemented as a discrete power resistor due the large voltage drop that it must create in order not to over drive load 220. If resistor 229 were implemented as a length of wire, it would usually be too long and/or it may also generate too much heat in a power cable to be practical.

A mirror image of the resistors and connections just described are provided at the negative side of the power supply 211 and load 220. Resistor 231 is the resistance of a length of two gauge wire from each power supply output terminal VS− to connection node 232. Resistor 233 is the resistance of a length of eight gauge wire from connection node 232 to a connector 234 between base module 12 and stacker module 16 for providing a current path from stacker 16.

Resistor 235 is the resistance of a length of a wire from the power supply sense terminal SENSE− to connection node 236. The power distribution network of the invention is grounded at connection node 236 so the wire of resistor 235 need not carry ground currents. Resistor 237 is implemented in the resistance of two parallel lengths of eight gauge wire from connection node 236 to a connector 238 between base module 12 and stacker module 16 for providing sense voltage and balancing current from and to stacker 16.

The current provided from load 220 in the base unit 12 is controlled by discrete current supply resistor 239. Resistor 239 is connected between connection node 232 and connection node 236. The nominal five volt power return connection to the circuit boards of load 220 in the base unit is also connected to node 236. By including resistors 229 and 239 in the power path of load 220 in the base unit, the voltage between VS+ and VS− can be made large enough to drive adequate current at specified voltage to a most remote load 280 while still not over driving load 220. The connections of SENSE+ and SENSE− to sense conductors 215 and 217 respectively, and not to the current supply lines 213 and 219 as is common in the prior art, provide the negative feedback necessary for controlling the voltage between VS+ and VS− to be larger than five volts in order to drive adequate current at a nominal five volts nominal to a most remote load. The resistance of the first current supply resistor 229 is directly proportional to current supplied to the second DC current consuming device 240, and to the resistance of the current supply conductor between the first DC current consuming device and the second DC current consuming device.

Referring now to the resistors within stacker module 16, resistor 241 is the resistance of a length of an eight gauge wire from the connector 224 to connection node 242. Likewise resistor 243 is the resistance of a length of an eight gauge wire from connection node 242 to a connector 244 between module 16 and a next module not shown, for providing current to this next module and other further downstream modules including module 26.

Sense conductor 215 is implemented within module 16 by resistor 245 and is the resistance of two parallel lengths of eight gauge wire from connector 228 to connection node 246. Resistor 247, is the resistance of two parallel lengths of eight gauge wire from connection node 246 to a connector 248 between module 16 and the next module for providing sense voltage and balancing current to and from the next module.

The current provided to load 240 in the module 16 is controlled by discrete current supply resistor 249. Resistor 249 is connected between connection node 242 and connection node 246. The positive nominal five volt power input to the circuit boards of load 240 is also connected to node 246.

A mirror image of the resistors and connections just described are provided at the negative side of load 240. Resistor 251 is the resistance of a length of an eight gauge wire from the connector 234 to connection node 252. Likewise resistor 253 is the resistance of a length of an eight gauge wire from connection node 252 to a connector 254 between module 16 and the next module for providing a current path from the next module.

Resistor 255 is the resistance of two parallel lengths of a wire from connector 238 to connection node 256. Resistor 257 is the resistance of two parallel lengths of eight gauge wire from connection node 256 to a connector 258 between module 16 and the next module for providing sense voltage and balancing current from and to the next module.

The current provided from load 240 in the module 16 is controlled by discrete current supply resistor 259. Resistor 259 is connected between connection node 252 and connection node 256. The nominal five volt power return connection to the circuit boards of load 240 in module 16 is also connected to node 256. By including resistors 249 and 259 in the power path of load 240, the voltage between connection nodes 242 and 252 remains large enough to drive adequate current at specified voltage to a most remote load while still not over driving load 240.

Referring now to the resistors within the most remote module 26, resistor 281 is the resistance of a length of an eight gauge wire from the connector 264 to connection node 282. Sense conductor 215 is implemented within module 26 by resistor 285 and is the resistance of two parallel lengths of eight gauge wire from connector 268 to connection node 286. The current provided to load 280 in the module 26 is controlled by discrete current supply resistor 289. Resistor 289 is connected between connection node 282 and connection node 286. The positive nominal five volt power input to the circuit boards in load 280 in the module 26 is also connected to node 286.

A mirror image of the resistors and connections described immediately above are provided at the negative side of load 280. Resistor 291 is the resistance of a length of an eight gauge wire connected from connector 274 to connection node 292. Resistor 295 is the resistance of two parallel lengths of eight gauge wire from connector 278 to connection node 296.

The current provided from load 280 in the module 26 is controlled by discrete current supply resistor 299. Resistor 299 is connected between connection node 292 and connection node 296. The nominal five volt power return connection to the load 280 in module 26 is also connected to node 296. By including resistors 289 and 299 in the power path of load 280, the voltage between connection nodes 242 and 252 remains more stable when currents through other loads change in the machine. On the other hand, resistors 289 and 299 require that supply voltage VS be larger overall and therefore greater resistive heat losses are the tradeoff for greater DC stability with changing DC loads.

Figure 3:
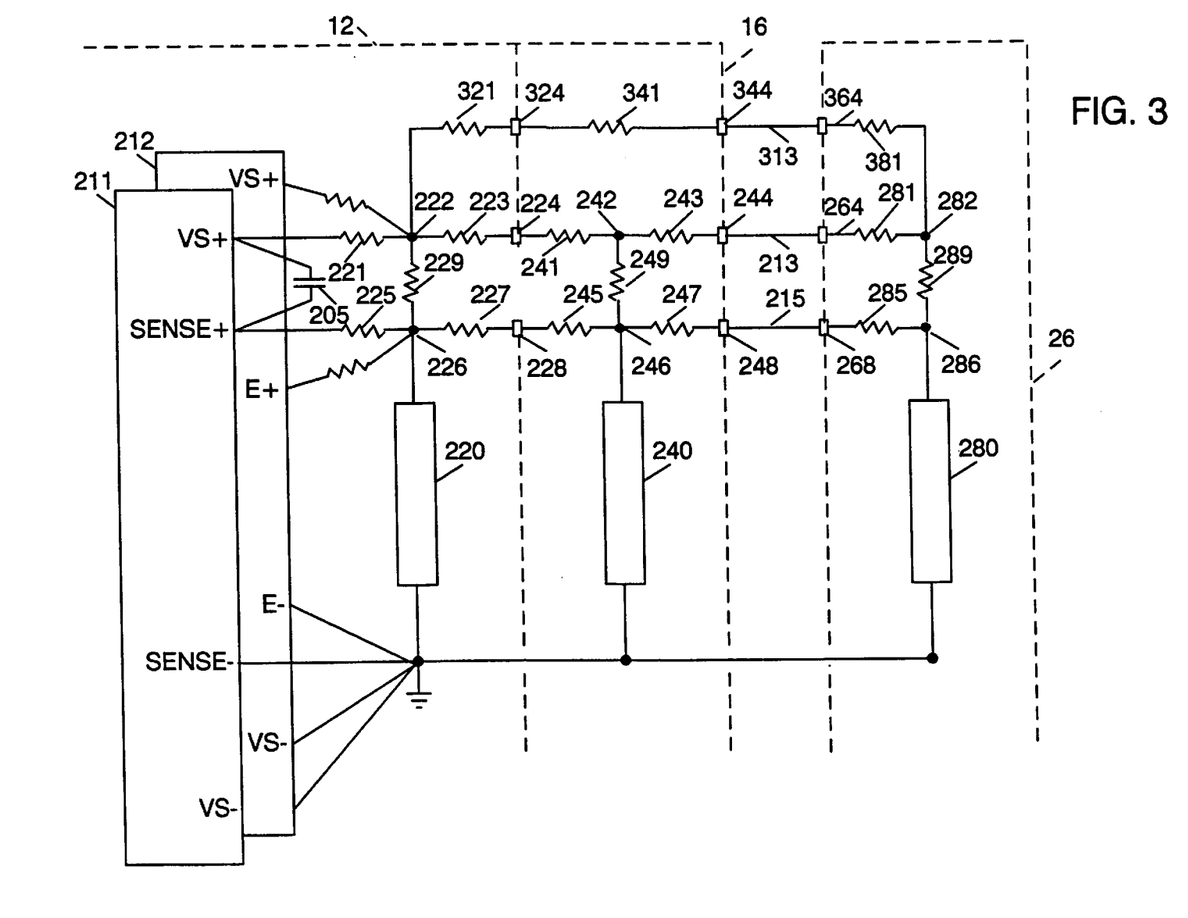
FIG. 3 is a circuit diagram of an alternate embodiment of the invention.

FIG. 3. is another embodiment of the invention which decreases sensitivity to load changes and also decreases over all power loss. In this embodiment, a second current supply conductor 313 is provided in parallel with conductor 213. Conductor 313 runs all the way through the modules and drives current into the most remote connection node 282. In the case where the invention is embodied in a loop configuration, conductor 313 will be connected at the last or end load in the loop as it is completed back to the power supply. Conductor 313 comprises a resistor 321 in the form of a length of wire inside base unit 12 connected from connection node 222 to a connector 324 between modules 12 and 16. Conductor 313 is further made up of resistor 341 in the form of a length of eight gauge wire connected between connectors 324 and 344 and resistor 381 in the form of a length of eight gauge wire connected between connectors 364 and connection node 282. In FIG. 3, the resistance of current supply resistor 289 has been reduced to substantially zero in order to minimize over all resistance power loss. The embodiment of FIG. 3 also shows another variety of the invention that is possible to implement. In some applications of the invention, the modules are mounted in highly conductive frames that are bolted together as one conductive unit as in a motor vehicle, watercraft, aircraft or other such craft. In such an application it may be possible to use the frame of the machine as a very low resistance return current path, and such an implementation removes the need for the mirror image resistances 239, 259 and 299. In this implementation, the VS−, and SENSE− terminals are connected together and become the ground connection for the machine. The frame of the machine becomes a very low resistance return path that does not introduce significant ground shifts. Accordingly logic control signals to the loads remain reliable.

Figure 4:
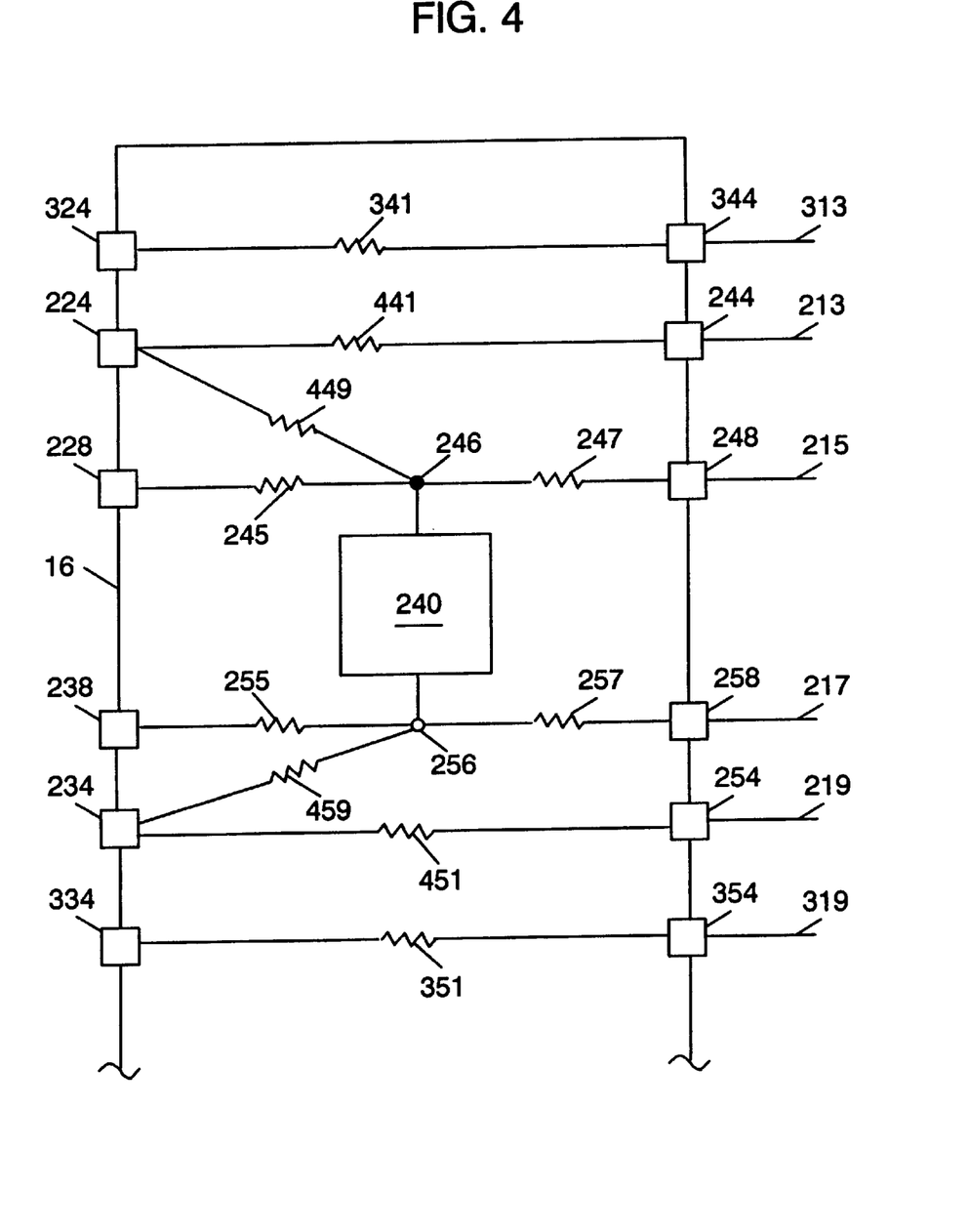
FIG. 4 is a diagram showing how current controlling resistors are embodied as lengths of wire.

FIG. 4 is a circuit diagram showing how current controlling resistors are embodied as lengths of wire. Module 16 of previous Figures is used as the example. Module 16 has power input connector 224 and power pass through connector 244. Instead of providing a separate connection node 242 as used in FIG. 2, when the required current controlling resistance is low enough, a resistor is implemented as a three and one half foot length of fourteen gauge wire 449 connected at one end to connector 224 and connected at another end to connection node 246. A single length of eight gauge wire 441 is then connected between connector 224 and connector 244 to implement both 241 and 243 of FIG. 2. On the negative side of the load 240, module 16 has power input connector 234 and power pass through connector 254. Instead of providing a separate connection node 252 as used in FIG. 2, a resistor is implemented as a length of fourteen gauge wire 459 connected at one end to connector 234 and connected at another end to connection node 256. A single length of eight gauge wire 451 is then connected between connector 234 and connector 254 to implement both 251 and 253 of FIG. 2. The load 240 is connected between nodes 246 and 256 as was done in FIG. 2 and the ground is also still connected to the sense line 217.

Figure 5:
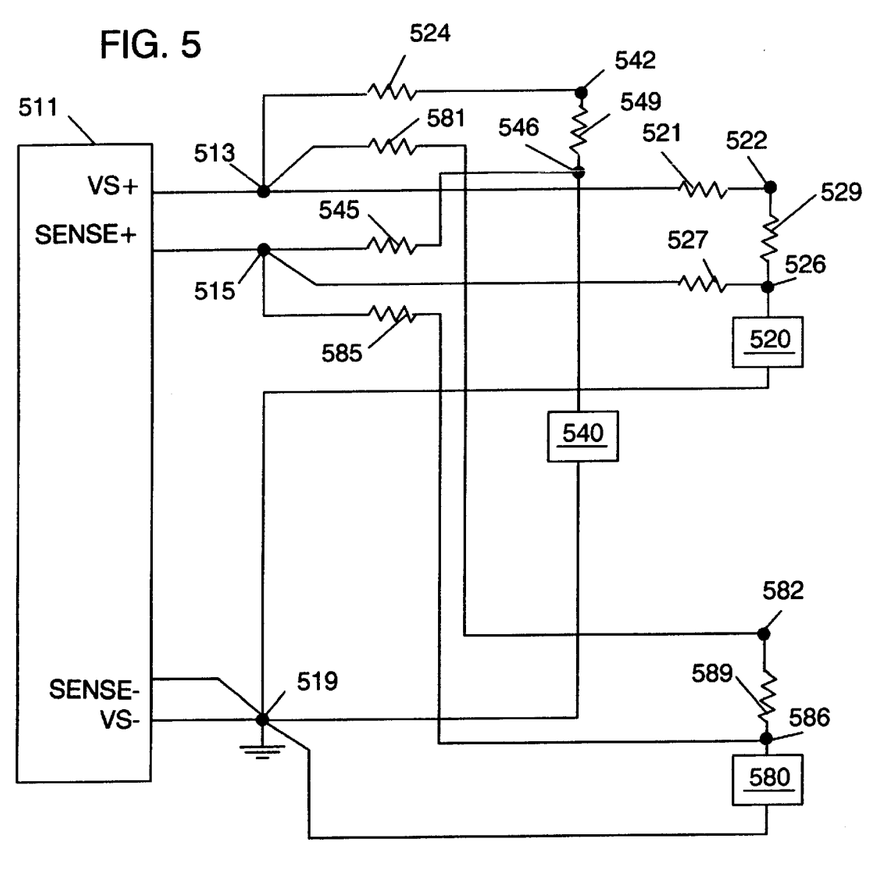
FIG. 5 is a circuit diagram of an alternate embodiment of the invention in a star configuration.

FIG. 5 which shows a star configuration of the invention. In FIG. 5, the connectors such as connectors 224 and 244 between modules are not shown because they may be implemented in a different way in a star configuration. The voltage and current supplying output VS+ is connected to current supply node 513. The voltage sensing input SENSE+ is connected to sense node 515. Both the voltage and current supplying output VS− and the voltage sensing input SENSE− is connected to node 519 where the system is grounded as it was in FIG. 3. Power to load 520 is provided by a star configured current supply conductor, a first segment being a length of wire having a resistance 521 which is connected between node 513 and connection node 522. The first segment of the sense conductor in this embodiment is a length of wire having a resistance 527 connected between sense node 515 and connection node 526. The current provided to load 520 in the base unit 12 is controlled by discrete current supply resistor 529. As before, load 520 includes a main computer and other digital logic circuits. Resistor 529 is connected between connection node 522 and connection node 526. The positive nominal five volt power input to the circuit boards of load 520 in the base unit is also connected to node 526. The nominal five volt power return connection to the circuit boards of load 520 in the base unit is connected to node 519 which is the ground return path through the machine frame as in FIG. 3.

Power to load 540 is provided by a second segment of the star configured current supply conductor, as a length of wire having a resistance 524 which is connected between node 513 and connection node 542. The second segment of the sense conductor in this embodiment is a length of wire having a resistance 545 connected between node 515 and connection node 546. The current provided to load 540 in the module 16 is controlled by discrete current supply resistor 549. Resistor 549 is connected between connection node 542 and connection node 546. The positive nominal five volt power input to the circuit boards of load 540 is also connected to node 546. The nominal five volt power return connection to the circuit boards of load 540 is connected to node 519 which is the very low resistance ground return path through the machine frame as in FIG. 3.

Power to load 580 is provided by a third segment of the star configured current supply conductor, as a length of wire having a resistance 581 which is connected between node 513 and connection node 582. The third segment of the sense conductor in this embodiment is a length of wire having a resistance 585 connected between node 515 and connection node 586. The current provided to load 580 in the module 26 is controlled by discrete current supply resistor 589. Resistor 589 is connected between connection node 582 and connection node 586. The positive nominal five volt power input to the circuit boards of load 580 is also connected to node 586. The nominal five volt power return connection to the circuit boards of load 580 is connected to node 519 which is the ground return path through the machine.

OPERATION OF THE INVENTION

Referring again to FIG. 3, operation of the invention will now be described, using the resistances obtained from the wire gauges described with respect to FIG. 2. Each of the current supply resistors, except resistor 229, is implemented as a three and one half foot length of fourteen gauge wire which yields a resistance of approximately ten milli-ohms. Resistor 229 is implemented as an eight point eight milli-ohm power resistor. Again, the nominal voltage desired across each load 220, 240 and 280 is five volts. In this example load 220 draws fifty five amperes through resistor 229. Load 240 draws twelve and one half amperes and load 280 draws four amperes. Between modules 16 and 26 are five additional modules, each having loads drawing nine and one half amperes.

In this FIG. 3, the voltage at node 286 is 5.00 volts. The voltage at node 246 is 5.05 volts and the voltage at node 226 is 5.07 volts. The power supply 211 was set at 5.07 volts in order to center the voltage variation at the loads. Variation in voltage from load to load is due to variations in load currents and non-ideal resistances. By setting the supply internal reference voltage at 5.07, power supply 211 provides 5.66 volts at VS+ in order to drive the loads described above.

The two modules between module 16 and 26 that are closest to module 16 have nodes at 5.01 volts and 4.98 volts respectively. The remaining three modules have nodes at 4.95 volts. These results when added to expected load variations and parasitic machine resistances are better than plus or minus three percent regulation. The use of the same amount of conductive wire in direct connection as in the prior art without the current supply resistance of the invention yields approximately plus or minus ten percent regulation in this same application. Digital circuit loads 220, 240 and 280 require five volts with a plus or minus five percent tolerance as was described earlier.

Of course, many additional modifications and adaptations to the present invention could be made in both embodiment and application without departing from the spirit of this invention. For example, although the invention has been described with respect to five volts, currents in tens of amperes and distances in meters, other voltages, distances and currents may be used to advantage with the invention. Also, the invention has been described with the loads connected together in a daisy chain fashion, however the invention can also be applied to a loop configuration or to a star configuration. Accordingly, this description should be considered as merely illustrative of the principles of the present invention and not in limitation thereof.

I claim:

1. A machine having a DC power supply and a number of DC current consuming loads comprising:
   a current supply conductor connected to a current and voltage supplying terminal of the DC power supply;
   a sense conductor connected to a voltage sensing terminal of the DC power supply;
   a ground conductor connected to a ground terminal of the DC power supply;
   a first DC current consuming load connected between the sense conductor and the ground voltage conductor at a first distance from the power supply;
   a first current supply resistor connected between the current supply conductor and the sense conductor at substantially the first distance from the power supply;
   a second DC current consuming load connected between the sense conductor and the ground voltage conductor at a second distance from the power supply;
   a second current supply resistor connected between the current supply conductor and the sense conductor at substantially the second distance from the power supply.

2. The machine of claim 1 wherein:
   the first current supply resistor supplies a current to the sense conductor at a node in close proximity to the first DC current consuming load that is substantially equal to the current required by the first DC current consuming load.

3. The machine of claim 2 wherein:
   the current supply conductor further comprises segments, the segments being connected together end to end, a load being connected to each segment by means of a current supply resistor.

4. The machine of claim 3 wherein the resistance of the first current supply resistor is directly proportional to the resistance of the current supply conductor between the first DC current consuming load and the second DC current consuming load.

5. The machine of claim 4 wherein the resistance of the first current supply resistor further is inversely proportional to current supplied to the first DC current consuming load.

6. The machine of claim 2 wherein:
   the current supply conductor further comprises segments, the segments being connected together and to the current supplying terminal of the DC power supply at one end, a load being connected to each segment at it's other end by means of a current supply resistor.

7. The machine of claim 2 further comprising:
   a second current supply conductor connected between a connection node in close proximity to the DC power supply at one end and the current supply conductor at another end of the second current supply conductor.

8. The machine of claim 3 further comprising:
   a second current supply conductor connected between a connection node in close proximity to the DC power supply at one end and a most remote segment of the current supply conductor at another end of the second current supply conductor.

9. The machine of claim 1 further comprising:
   a capacitor having a connection connected to the current conductor at a DC power supply end of the current conductor and having a negative connection connected to the sense conductor at a DC power supply end of the sense conductor.

10. A machine having a DC power supply and a number of DC current consuming devices comprising:
    a positive current supply conductor connected to a positive supply terminal of the DC power supply;
    a negative current supply conductor connected to a negative supply terminal of the DC power supply;
    a positive sense voltage conductor connected to a positive sense voltage terminal of the DC power supply;
    a negative sense voltage conductor connected to a negative sense voltage terminal of the DC power supply;
    a first DC current consuming device connected between the positive sense conductor and the negative sense conductor at a first distance from the power supply;
    a first positive current supply resistor connected between the positive current supply conductor and the positive sense conductor at substantially the first distance from the power supply;
    a first negative current supply resistor connected between the negative current supply conductor and the negative sense conductor at substantially the first distance from the power supply;
    a second DC current consuming device connected between the positive sense conductor and the negative sense conductor at a second distance from the power supply;
    a second positive current supply resistor connected between the positive current supply conductor and the positive sense conductor at substantially the second distance from the power supply;
    a second negative current supply resistor connected between the negative current supply conductor and the negative sense conductor at substantially the second distance from the power supply.

11. The machine of claim 10 further comprising:
    a ground connection to one of the sense conductors;
    the other sense conductor comprising a voltage controlling conductor of the machine.

12. The machine of claim 11 wherein the first positive current supply resistor supplies a current to the positive sense conductor at a node in close proximity to the first DC current consuming device that is substantially equal to the current required by the first DC current consuming device.

13. The machine of claim 12 wherein each current supply conductor further comprises segments, the segments being connected together end to end, a device being connected to each segment by means of a current supply resistor.

14. The machine of claim 13 wherein resistance of the first positive current supply resistor is directly proportional to resistance of the positive current supply conductor between the first DC current consuming device and the second DC current consuming device.

15. The machine of claim 14 wherein resistance of the first positive current supply resistor further is inversely proportional to current supplied to the first DC current consuming device.

16. The machine of claim 12 wherein each current supply conductor further comprises segments, the segments being connected together and to the current supplying terminal of the DC power supply at one end, a device being connected to each segment at it's other end by means of a current supply resistor.

17. The machine of claim 13 further comprising:
 a second positive current supply conductor connected between a connection node in close proximity to the DC power supply at one end and a most remote segment of the positive current supply conductor at another end of the second positive current supply conductor.

18. The machine of claim 12 further comprising:
 a capacitor having a positive connection connected to the positive current conductor at a DC power supply end of the positive current conductor and having a negative connection connected to the positive sense conductor at a DC power supply end of the positive sense conductor; and
 a capacitor having a positive connection connected to the negative sense conductor at a DC power supply end of the negative sense conductor and having a negative connection connected to the negative current conductor at a DC power supply end of the negative current conductor.

* * * * *